(12) United States Patent
Nguyen et al.

(10) Patent No.: US 6,176,663 B1
(45) Date of Patent: Jan. 23, 2001

(54) APPARATUS FOR REDUCING FASTENER BENDING STRESS IN FLANGED CONNECTIONS

(75) Inventors: Lan T. Nguyen, League City; Stephen J. Walker, Houston, both of TX (US)

(73) Assignee: Cooper Cameron Corporation, Houston, TX (US)

( * ) Notice: Under 35 U.S.C. 154(b), the term of this patent shall be extended for 0 days.

(21) Appl. No.: 09/216,201

(22) Filed: Dec. 18, 1998

(51) Int. Cl.[7] .............. F16B 33/00; F16L 23/00
(52) U.S. Cl. ............... 411/368; 411/537; 411/538; 411/135; 411/916; 285/412
(58) Field of Search .............. 411/537, 538, 411/135, 148, 436, 230, 940, 948; 285/368, 412

(56) References Cited

U.S. PATENT DOCUMENTS

| | | |
|---|---|---|
| 540,021 | 5/1895 | Kime . |
| 815,581 * | 3/1906 | Dean ................... 285/368 |
| 1,614,221 | 1/1927 | Westerbrook . |
| 2,383,068 | 8/1945 | MacLean, Jr. . |
| 3,171,518 * | 3/1965 | Bergmann ............ 411/537 |
| 3,188,115 * | 6/1965 | Morrish ................ 285/368 |
| 3,285,568 | 11/1966 | Biach . |
| 3,749,362 | 7/1973 | O'Connor et al. . |
| 3,847,041 | 11/1974 | Meschonat et al. . |
| 4,177,999 * | 12/1979 | Raber ................... 411/537 |
| 4,640,537 * | 2/1987 | Chaix ................... 285/368 |
| 4,991,563 * | 2/1991 | Ashley ................. 411/916 |
| 5,230,540 * | 7/1993 | Lewis ................... 285/412 |
| 5,771,266 * | 6/1998 | Fabris .................. 411/916 |

FOREIGN PATENT DOCUMENTS

| | | | |
|---|---|---|---|
| 1521681 * | 4/1968 | (FR) | 285/368 |
| 93388 * | 2/1959 | (NO) | 285/368 |
| 779715 * | 11/1980 | (RU) | 285/368 |

* cited by examiner

Primary Examiner—Flemming Saether
(74) Attorney, Agent, or Firm—Jackie Lee Duke

(57) ABSTRACT

An apparatus for reducing the bending stress imparted to threaded fasteners in flanged connections is disclosed. The apparatus includes a stress reducing washer positioned between the head of the threaded fastener and a counterbore in the backface of the flange. In a first embodiment, the stress reducing washer uses a tapered upper surface oriented with respect to the flange to compensate for flange deflection as the threaded fastener is tightened to a predetermined torque value. Second and third embodiments utilizing spherical and cylindrical surfaces are also shown. A fourth embodiment eliminates the need for the stress reducing washer and machines the tapered surface in the backface of the flange.

22 Claims, 21 Drawing Sheets

APPARATUS FOR REDUCING FASTENER BENDING STRESS IN FLANGED CONNECTIONS

BACKGROUND OF THE INVENTION

1. Field of the Invention

This invention relates to a novel apparatus for reducing stresses due to bending in threaded fasteners, particularly bolts and cap screws, used in connecting flanged connections. Such flanged connections have a wide variety of industrial uses including connecting structural members that will be subjected to critical external loads and in sealing high pressure vessels. The flanges used in such applications must be maintained in face to face contact to ensure proper operation. This face to face contact is maintained by the plurality of threaded fasteners that are tightened to a high percentage of their yield strength to ensure this contact is maintained. It is well known in the art that such flanges bend in an axial or meridional direction during this tightening procedure. This meridional bending is transmitted to the threaded fasteners and is known to contribute significantly to the stress in the threaded fastener and reduces the amount of tightening to which the threaded fastener can be safely subjected. This in turn reduces the face to face contact between the flanges and therefore the load to which the flanged connection can be subjected.

The present invention has particular applicability in the oil and gas industry where large diameter tubular members with flanged end connections, called "risers" or "riser joints", are used. These risers are used in offshore drilling and production operations and extend from the wellhead at the ocean floor to a surface vessel. These risers have typically been manufactured in fifty and eighty foot lengths. During normal operation the flanged connection between adjacent riser joints must contain internal pressure along with enormous external loads due to environmental conditions. It is critical that these flanged connections, and the threaded fasteners holding them together, function flawlessly. These flanged connections and the threaded fasteners connecting them are the area to which the present invention most closely applies.

2. Description of Related Art

An apparatus for stretching threaded fasteners is shown in U. S. Pat. No. 3,749,362 (O'Connor et al.) The apparatus shown by O° Connor et al. uses an external fastener stretcher threaded onto a bolt to apply an axial load to the bolt wherein the bolt's nut can then be tightened with minimal torque. Removal of the fastener stretcher allows the bolt and nut to retain the load induced in the bolt.

SUMMARY OF THE INVENTION

The current invention uses a uniquely shaped stress reducing washer designed to compensate for the axial or meridional direction bending that the flange undergoes during fastener tightening. The stress reducing washer ensures that as the flanges bend the threaded fastener remains straight and thereby minimizes the bending stress transmitted to the fastener.

According to the present invention, in a first embodiment the stress reducing washer has upper and lower planar surfaces, the lower surface perpendicular to the fastener axis while the upper surface is tapered radially. The stress reducing washer is positioned in a counterbore in the flange backface. A pair of retaining pins ensure the stress reducing washer is properly oriented and is retained in the counterbore. As the fastener is tightened to its predetermined value and the flange deflects, the head of the fastener remains vertical while the washer moves radially. At maximum fastener torque and flange deflection, the tapered upper surface of the stress reducing washer is in substantially face to face contact with the head of the fastener and perpendicular to the axis of the fastener.

In a second embodiment of the invention, the stress reducing washer is of two part construction. The lower washer has a flat lower face with a spherical upper face. The upper washer has a flat upper face with a spherical lower face which engages the spherical upper face of the lower washer. As in the first embodiment, as the fastener is tightened to its predetermined value and the flange deflects, the head of the fastener remains vertical while the spherical faces of the upper and lower washers move radially. Under all conditions, loaded or unloaded, the flat upper face of the upper washer is in substantially face to face contact with the head of the fastener and perpendicular to the axis of the fastener.

In a third embodiment of the invention, the stress reducing washer is of two part construction also. The lower washer has a flat lower face with a cylindrical upper face. The upper washer has a flat upper face with a cylindrical lower face which engages the cylindrical upper face of the lower washer. As in the first embodiment, as the fastener is tightened to its predetermined value and the flange deflects, the head of the fastener remains vertical while the cylindrical faces of the upper and lower washers move radially outwardly. Under all conditions, loaded or unloaded, the flat upperfaceof the upper washer is in substantially face to face contact with the head of the fastener and perpendicular to the axis of the fastener.

In a fourth embodiment of the invention, the backface of the flange is machined with a radially tapered surface adjacent each fastener hole to emulate the stress reducing washer of the first embodiment.

A principal object of the present invention is to provide an apparatus to reduce the bending stress transmitted to threaded fasteners due to deflection of the flange.

Another object of the present invention is to provide an apparatus for increasing the fatigue life of threaded fasteners used in flanged connections.

A final object of the present invention is to provide an apparatus for reducing the bending stress in threaded fasteners without requiring the use of special fasteners.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PRESENTLY PREFERRED EMBODIMENTS

Figure 1:
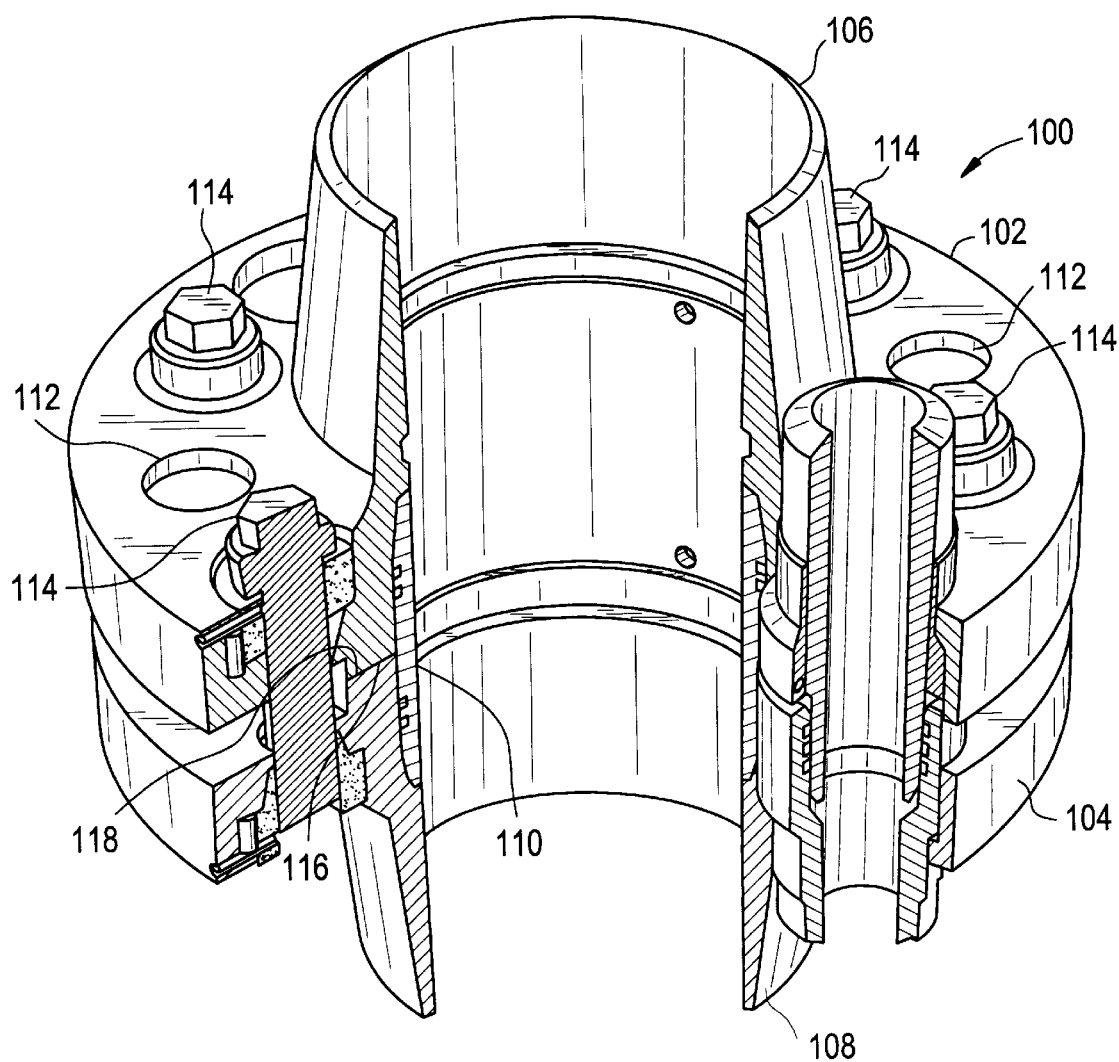
FIG. 1 is an isometric view of a riser connector used in subsea oil and gas drilling operations with the stress reducing washers of the present invention installed.

With reference to the drawings, and particularly to FIG. 1, riser connector 100 is shown in an isometric view. Riser connector 100 includes first or upper flange 102 and second or lower flange 104. Upper flange 102 and lower flange 104 include butt weld preparations 106 and 108, respectively, for attaching appropriate sized tubular members (not shown) as is well known in the art. Seal element 110 is disposed in the bores of upper flange 102 and lower flange 104. A plurality of fastener holes 112 are spaced circumferentially around upper flange 102 and lower flange 104 with threaded fasteners 114 disposed therein. Upper flange 102 and lower flange 104 include raised faces 116 and 118, respectively, that are held in face to face contact when threaded fasteners 112 are tightened to a specified torque value.

Figure 2:
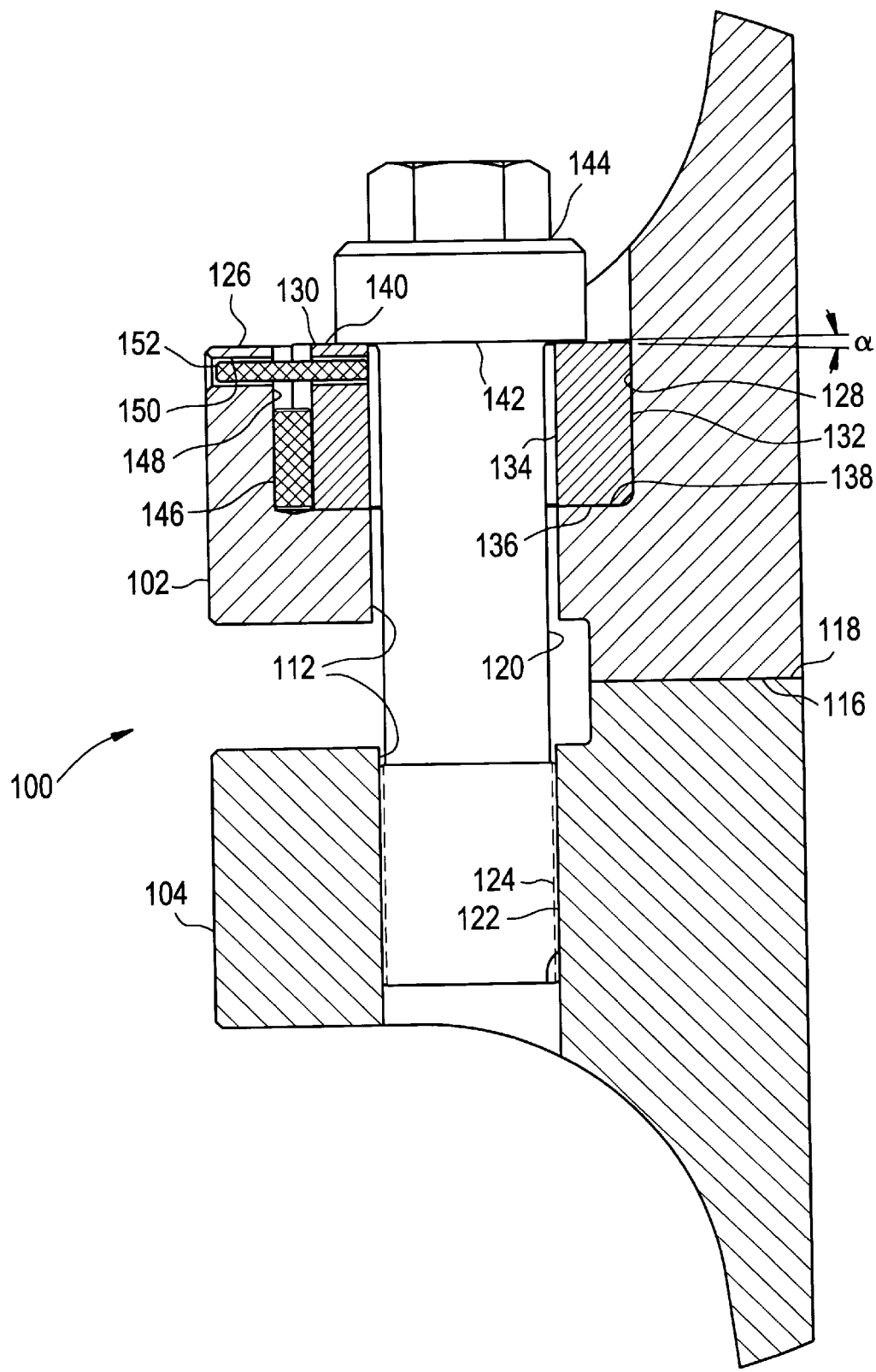
FIG. 2 is a sectional view of the first embodiment of the stress reducing washer with the riser connectors unloaded.

As best seen in FIG. 2, the first embodiment of the present invention includes upper flange 102 and lower flange 104 with raised faces 116 and 118, respectively. Fastener hole 112 in upper flange 102 receives threaded fastener 120 in close fitting relationship. Fastener hole 112 in lower flange 104 includes threads 122 to engage threads 124 of threaded fastener 120. Upper flange 102 includes backface 126 with counterbore 128 therein and concentric with fastener hole 112. Positioned within counterbore 128 is stress reducing washer 130.

Stress reducing washer 130 is a generally cylindrically shaped member with its outside diameter 132 sized to fit closely within counterbore 128 and its inside diameter 134 sized to allow clearance for threaded fastener 120 to pass through. The lower face 136 of stress reducing washer 130 is perpendicular to the axis of threaded fastener 120 and in face to face contact with lower face 138 of counterbore 128. The upper face 140 of stress reducing washer 130 is tapered radially as shown to define angle a between upper face 140 and the underside 142 of the head 144 of threaded fastener 120. When threaded fastener 120 is initially installed and threaded into lower flange 104, the underside 142 of the head 144 of threaded fastener 120 contacts stress reducing washer 130 at the outer edge and angle a is as shown. Proper orientation of stress reducing washer 130 is maintained by orientation pin 146. Orientation hole 148 is drilled into backface 126 and stress reducing washer 130. Orientation pin 146 is inserted to ensure stress reducing washer 130 cannot rotate with respect to upper flange 102. A radially disposed hole 150 is drilled in upper flange 102 and stress reducing washer 130. A retaining pin 152, closely fitting therein, is inserted to ensure orientation pin 148 remains intact.

Figure 3:
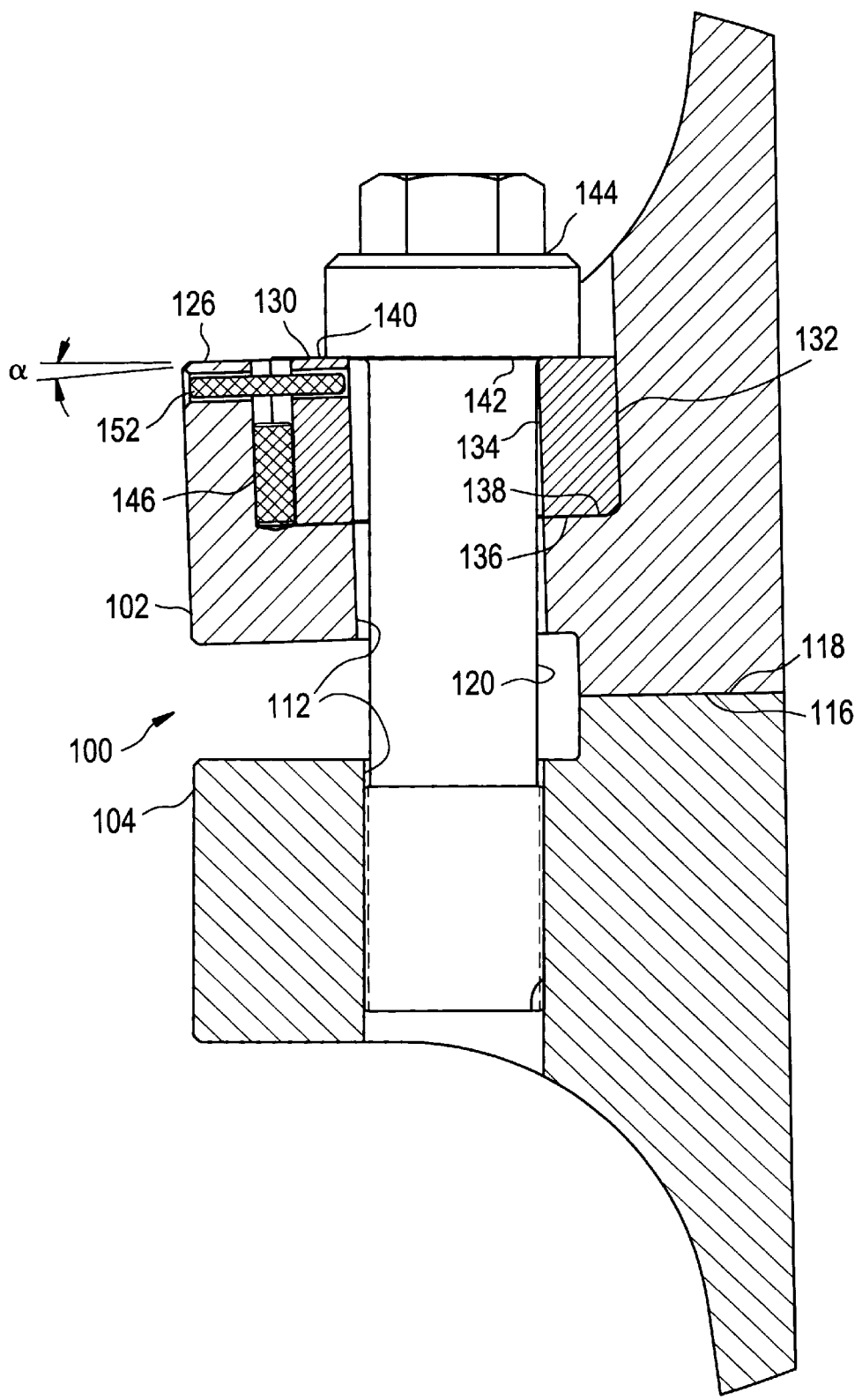
FIG. 3 is a sectional view of the first embodiment of the stress reducing washer with the riser connectors loaded.

As best seen in FIG. 3, when threaded fastener 120 is fully tightened, the flange 102 has deflected downwardly by the angle a. Stress reducing washer 130 has now shifted radially outwardly and upper face 140 of stress reducing washer 130 is in face to face contact with underside 142 of the head 144 of threaded fastener 120. This relative movement of stress reducing washer 130 minimizes the bending stress transmitted to threaded fastener 120. This reduction in bending stress on threaded fastener 120 is a significant factor in increasing the fatigue life of threaded fasteners 120.

Figure 10:
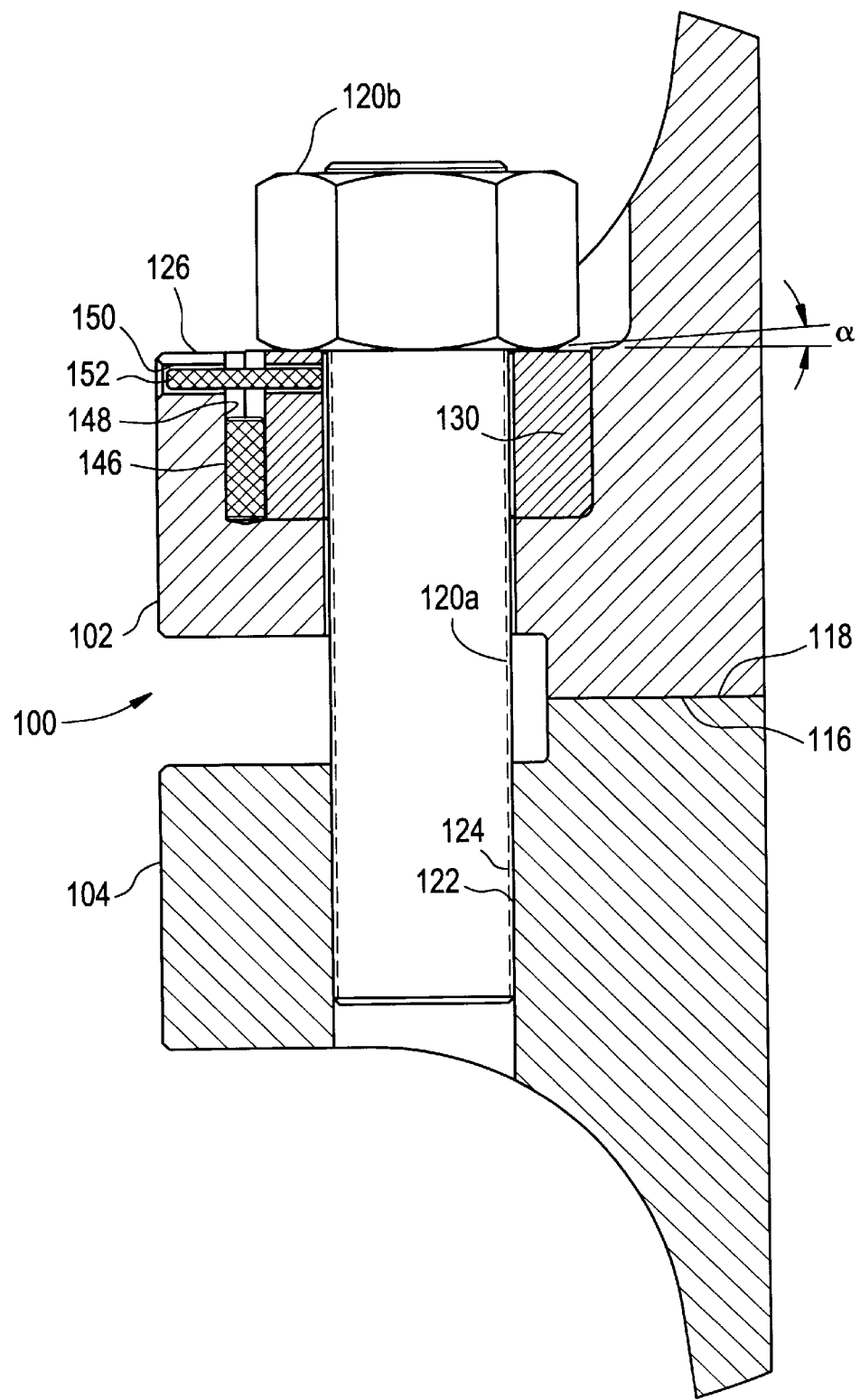
FIG. 10 is a sectional view of a first alternate form of the first embodiment of the stress reducing washer with the riser connectors unloaded.
Figure 11:
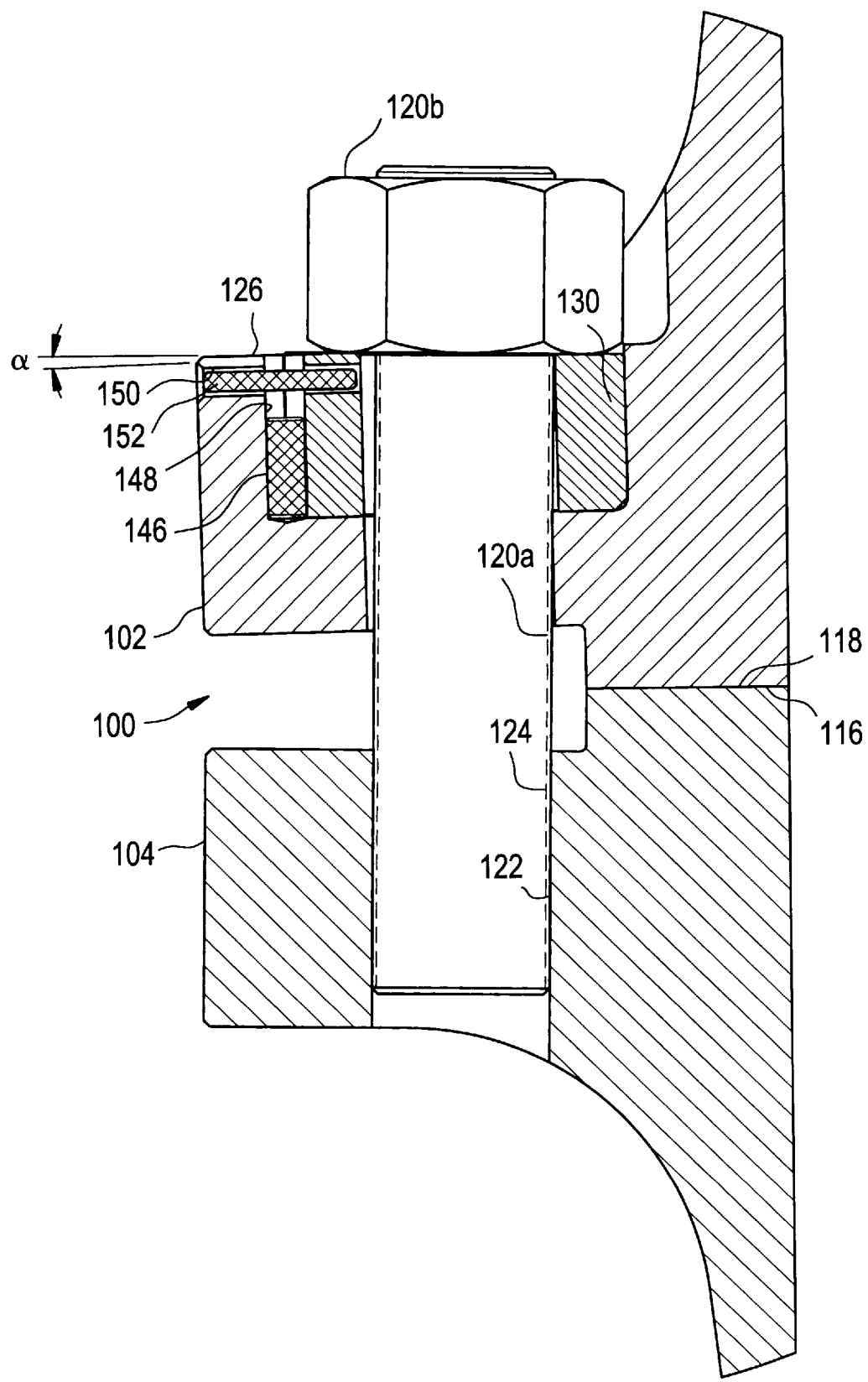
FIG. 11 is a sectional view of the first alternate form of the first embodiment of the stress reducing washer with the riser connectors loaded.

A first alternate form of the first embodiment is shown in FIGS. 10 and 11. This alternate form substitutes fastener 120a and nut 120b for fastener 120. Those items that are the same as in the first embodiment retain the same numeric designation. In all other respects, this first alternate form of the first embodiment functions the same as in the first embodiment.

Figure 12:
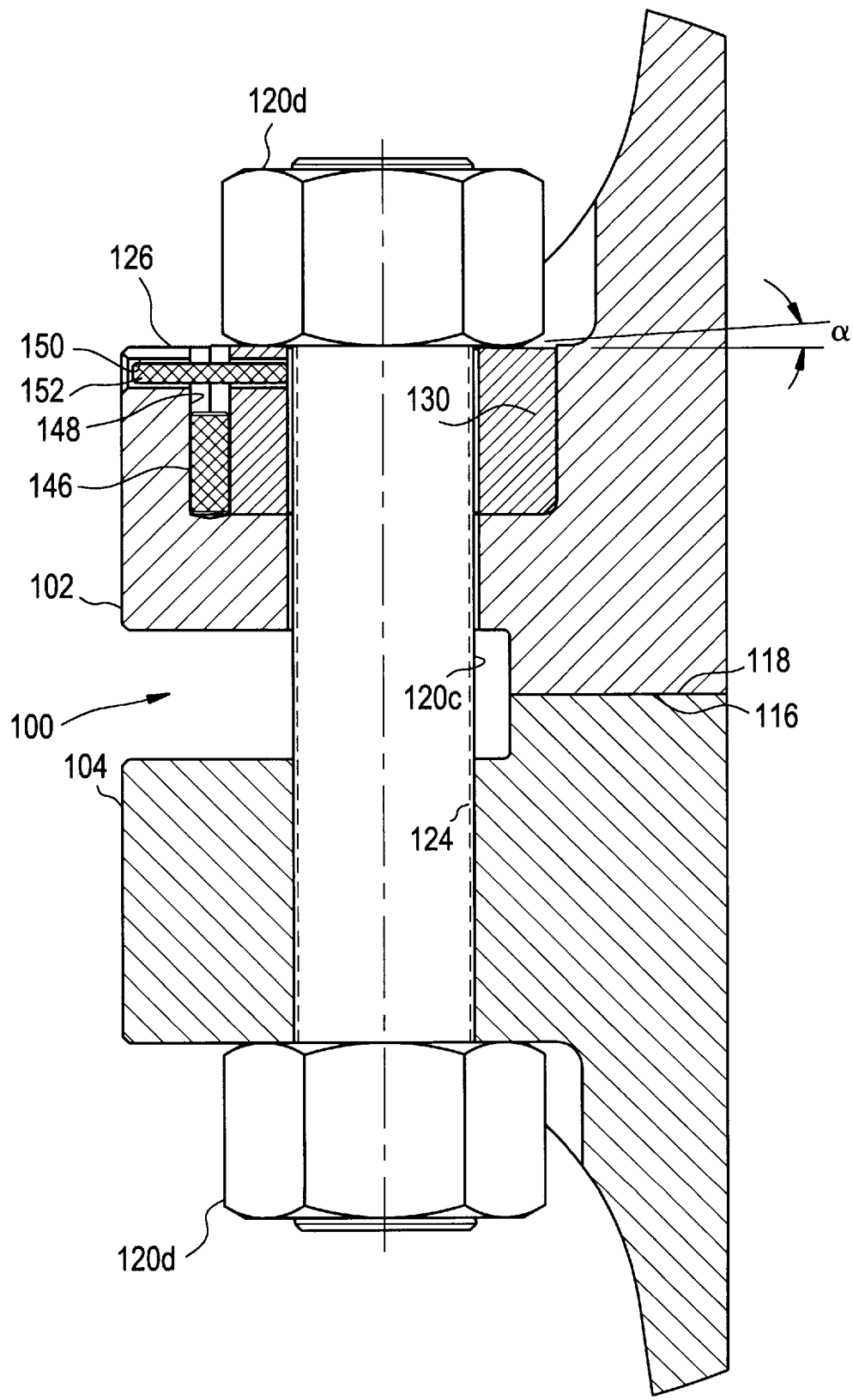
FIG. 12 is a sectional view of the second alternate form of the first embodiment of the stress reducing washer with the riser connectors unloaded.
Figure 13:
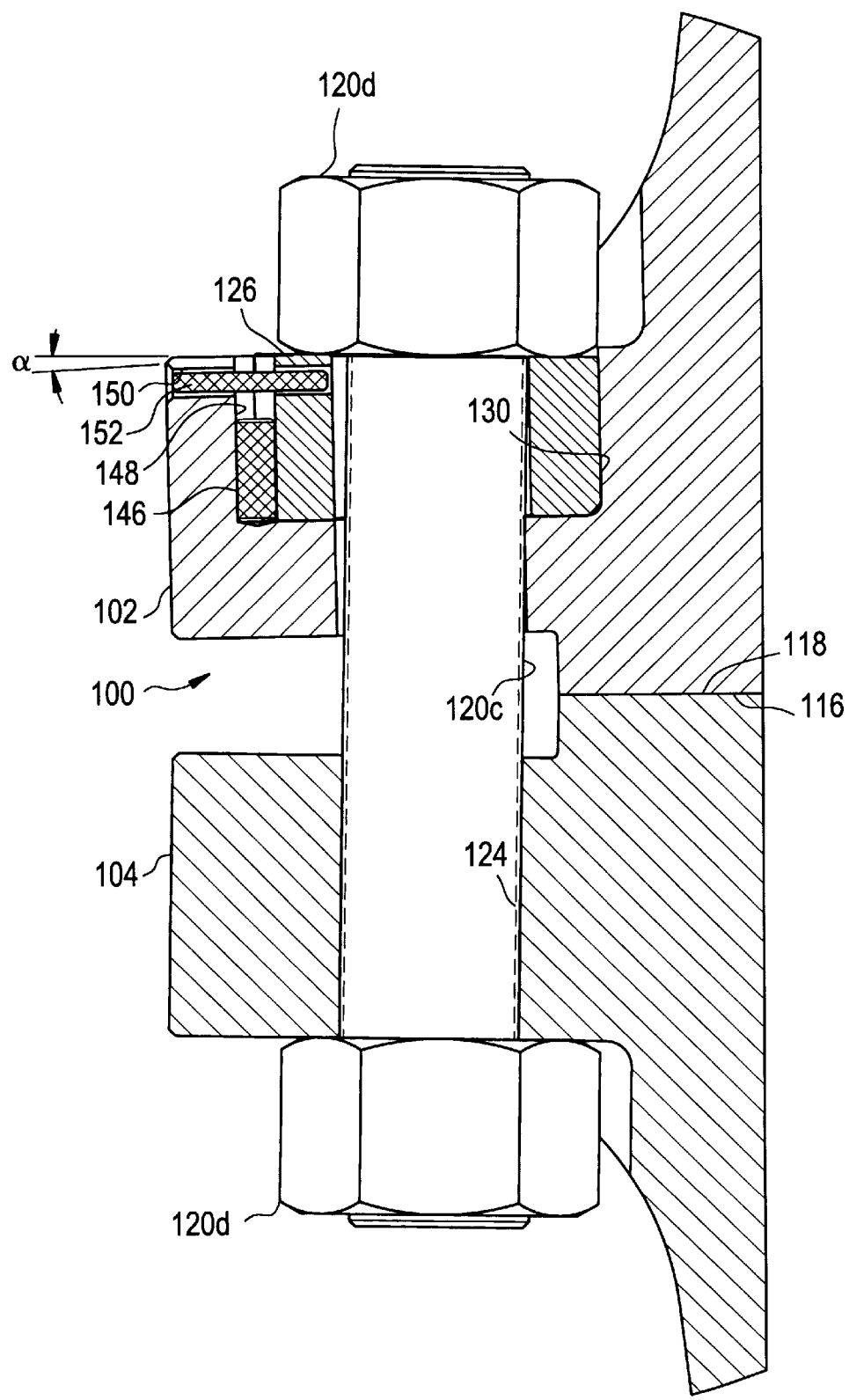
FIG. 13 is a sectional view of the second alternate form of the first embodiment of the stress reducing washer with the riser connectors loaded.

A second alternate form of the first embodiment is shown in FIGS. 12 and 13. This second alternate form substitutes fastener 120c and nuts 120d for fastener 120. Those items that are the same as in the first embodiment retain the same numeric designation. In all other respects, this second alternate form of the first embodiment functions the same as in the first embodiment.

Figure 4:
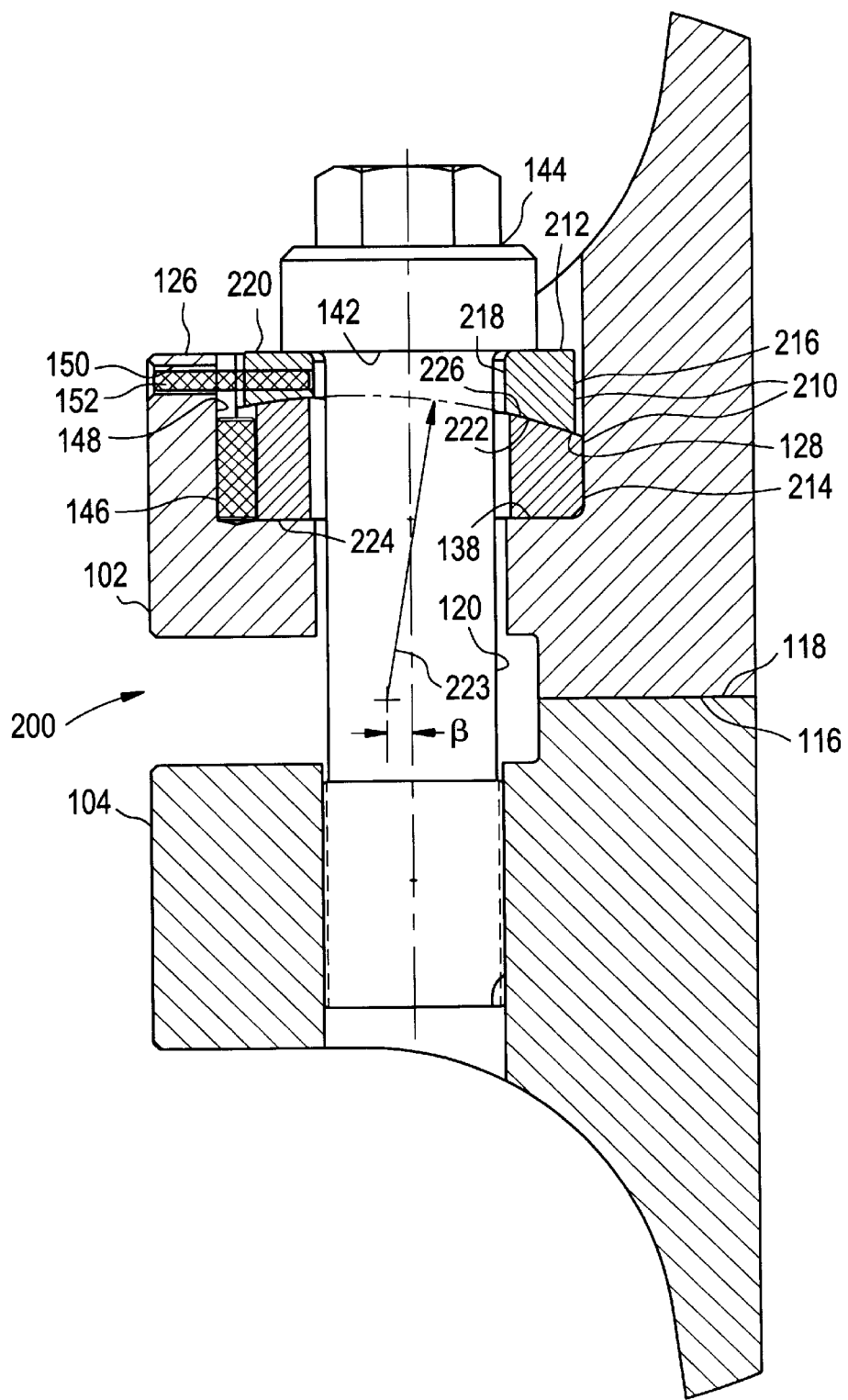
FIG. 4 is a sectional view of the second embodiment of the stress reducing washer with the riser connectors unloaded.

A second embodiment of the present invention is shown in FIG. 4. Those items that are the same as in the first embodiment retain the same numeric designation. As in the first embodiment, riser connector 200 includes upper flange 102 and lower flange 104 with raised faces 116 and 118, respectively. Fastener hole 112 in upper flange 102 receives threaded fastener 120 in close fitting relationship. Fastener hole 112 in lower flange 104 includes threads 122 to engage threads 124 of threaded fastener 120. Upper flange 102 includes backface 126 with counterbore 128 therein and concentric with fastener hole 112. Positioned within counterbore 128 is stress reducing washer 210.

Stress reducing washer 210 is of two part construction and includes upper washer 212 and lower washer 214. Upper washer 212 is a generally cylindrically shaped member with its outside diameter 216 and inside diameter 218 sized to allow lateral movement within counterbore 128 in a manner to be described hereinafter. The upper face 220 of upper washer 212 is flat to engage underside 142 of the head 144 of threaded fastener 120. The lower face 222 of upper washer 212 is spherically shaped as shown. The center of radius 223 of spherical lower face 222 is offset from the axis of threaded fastener 120 by the distance β. This offset distance ensures proper relative movement between upper washer 212 and lower washer 214 to minimize the bending stresses on threaded fastener 120 in a manner to be described. The lower face 224 of lower washer 214 is perpendicular to the axis of threaded fastener 120 and in face to face contact with lower face 138 of counterbore 128. The upper face 226 of lower washer 214 is spherically shaped and matches the shape of lower face 222 of upper washer 212 with the same radius 223. When threaded fastener 120 is initially installed and threaded into lower flange 104, the underside 142 of the head 144 of threaded fastener 120 contacts stress reducing washer 210. Proper orientation of stress reducing washer 210 is maintained by orientation pin 146. Orientation hole 148 is drilled into backface 126 and lower washer 214 of stress reducing washer 210. Orientation pin 146 is inserted to ensure stress reducing washer 210 cannot rotate with respect to upper flange 102. A radially disposed hole 150 is drilled in upper flange 102 and upper washer 216 of stress reducing washer 210. A retaining pin 152, closely fitting therein, is inserted to ensure orientation pin 148 remains intact.

Figure 5:
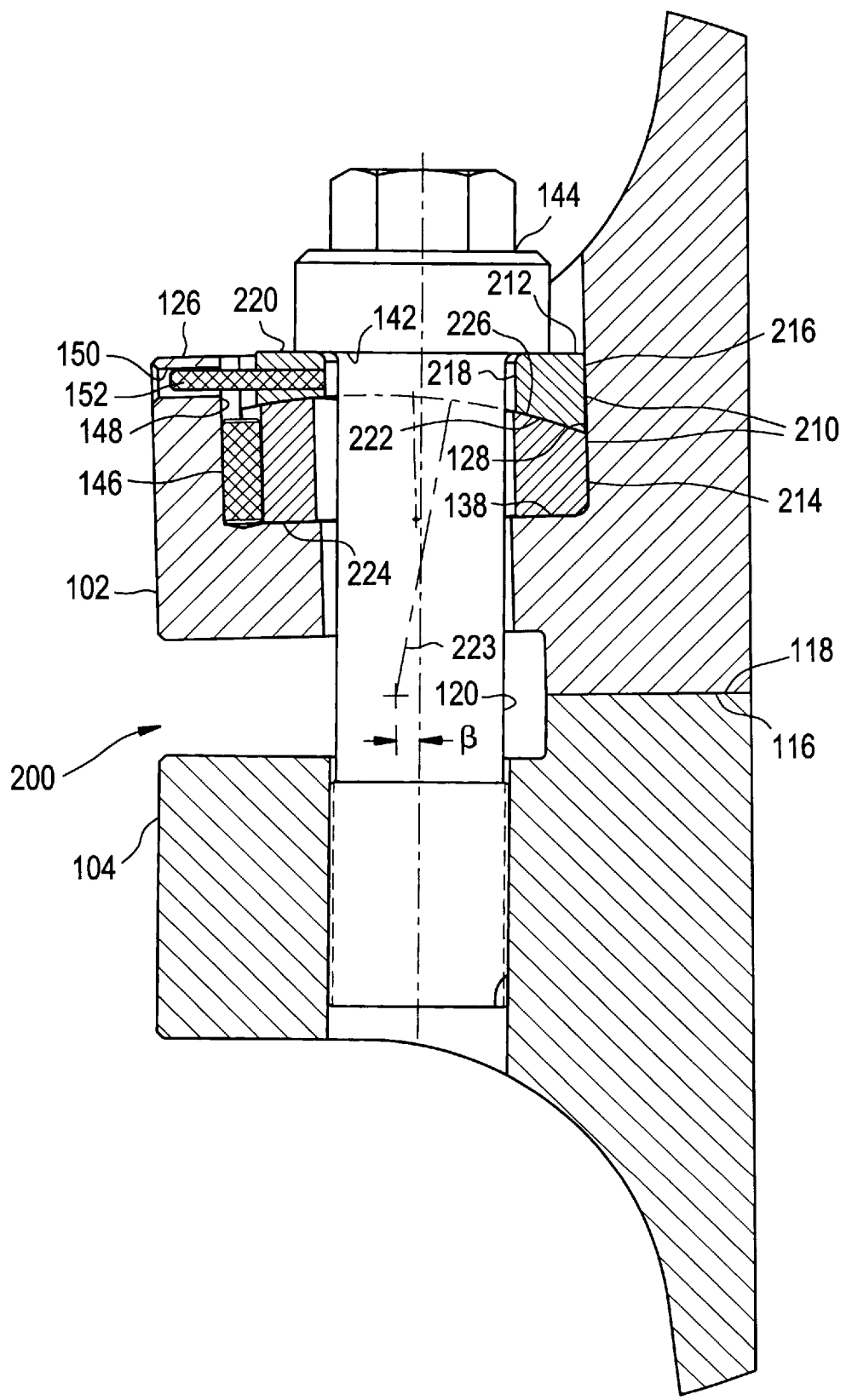
FIG. 5 is a sectional view of the second embodiment of the stress reducing washer with the riser connectors loaded.

As best seen in FIG. 5, when threaded fastener 120 is fully tightened, the flange 102 has deflected downwardly. Upper washer 212 of stress reducing washer 210 has now shifted radially with respect to flange 102 and upper face 220 of upper washer 212 of stress reducing washer 210 is in face to face contact with underside 142 of the head 144 of threaded fastener 120. This relative movement of upper washer 212 of stress reducing washer 210 minimizes the bending stress transmitted to threaded fastener 120. This reduction in bending stress on threaded fastener 120 is a significant factor in increasing the fatigue life of threaded fasteners 120.

Figure 14:
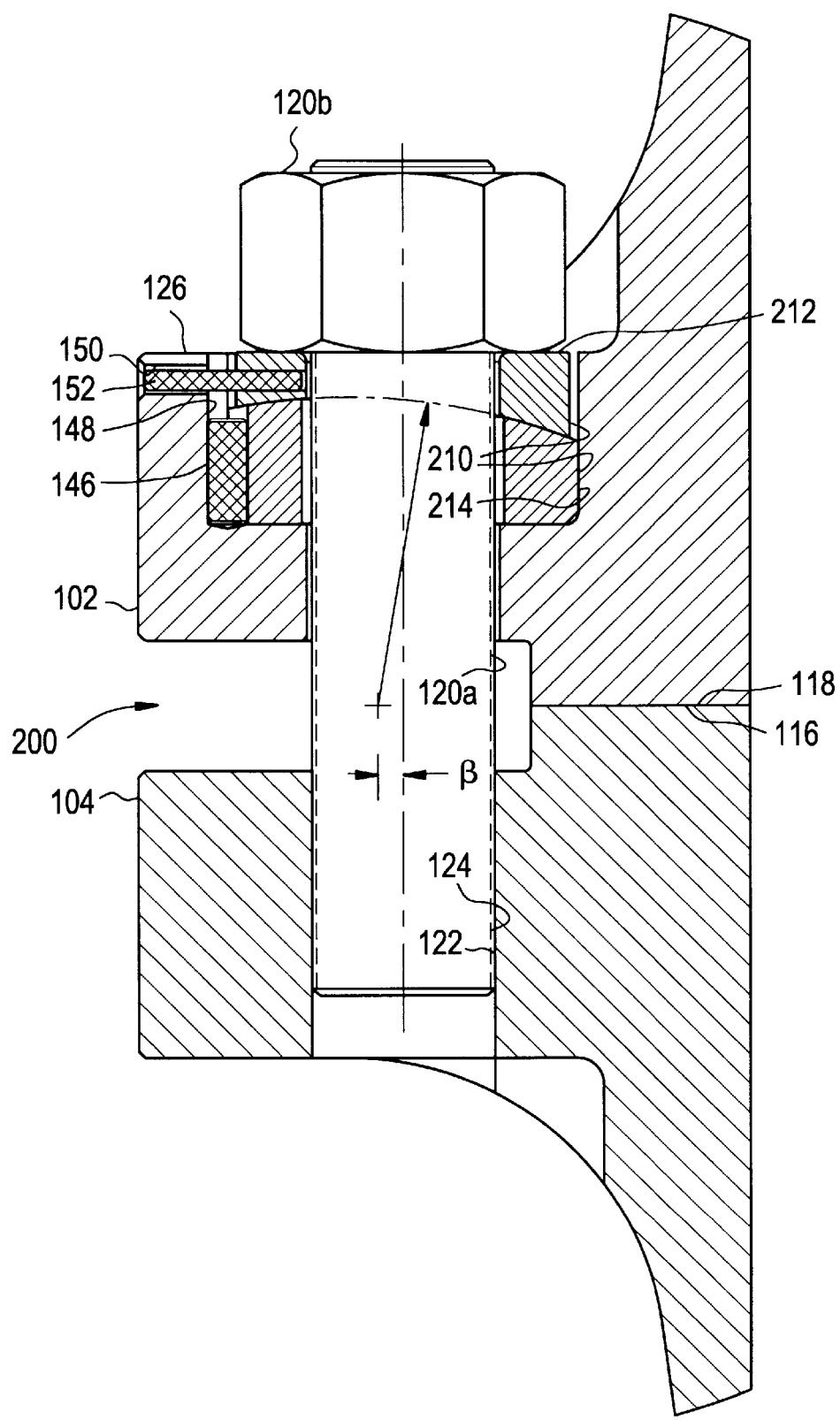
FIG. 14 is a sectional view of the first alternate form of the second embodiment of the stress reducing washer with the riser connectors unloaded.
Figure 15:
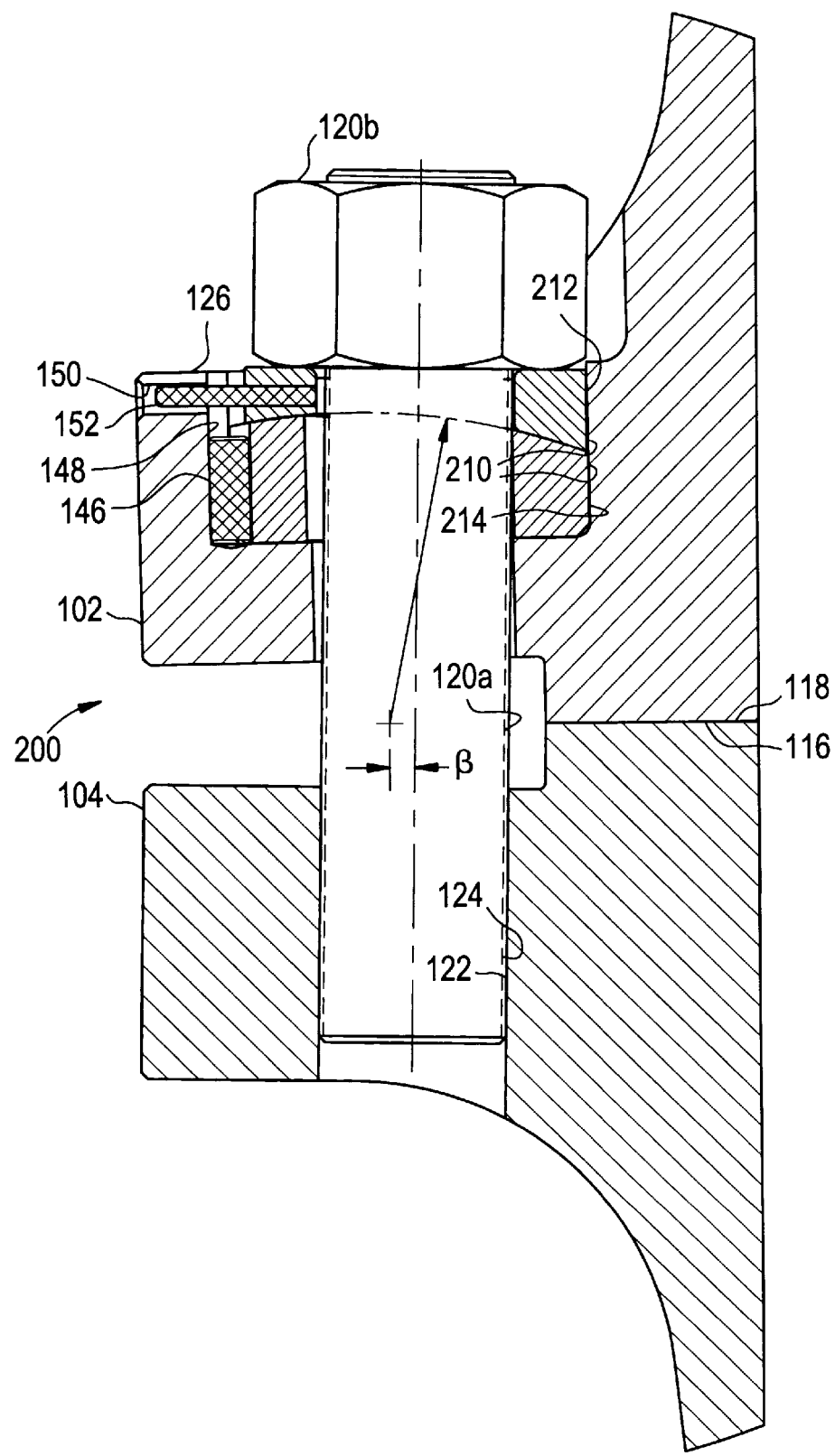
FIG. 15 is a sectional view of the first alternate form second embodiment of the stress reducing washer with the riser connectors loaded.

A first alternate form of the second embodiment is shown in FIGS. 14 and 15. This alternate form substitutes fastener 120a and nut 120b for fastener 120. Those items that are the same as in the second embodiment retain the same numeric designation. In all other respects, this first alternate form of the second embodiment functions the same as in the second embodiment.

Figure 16:
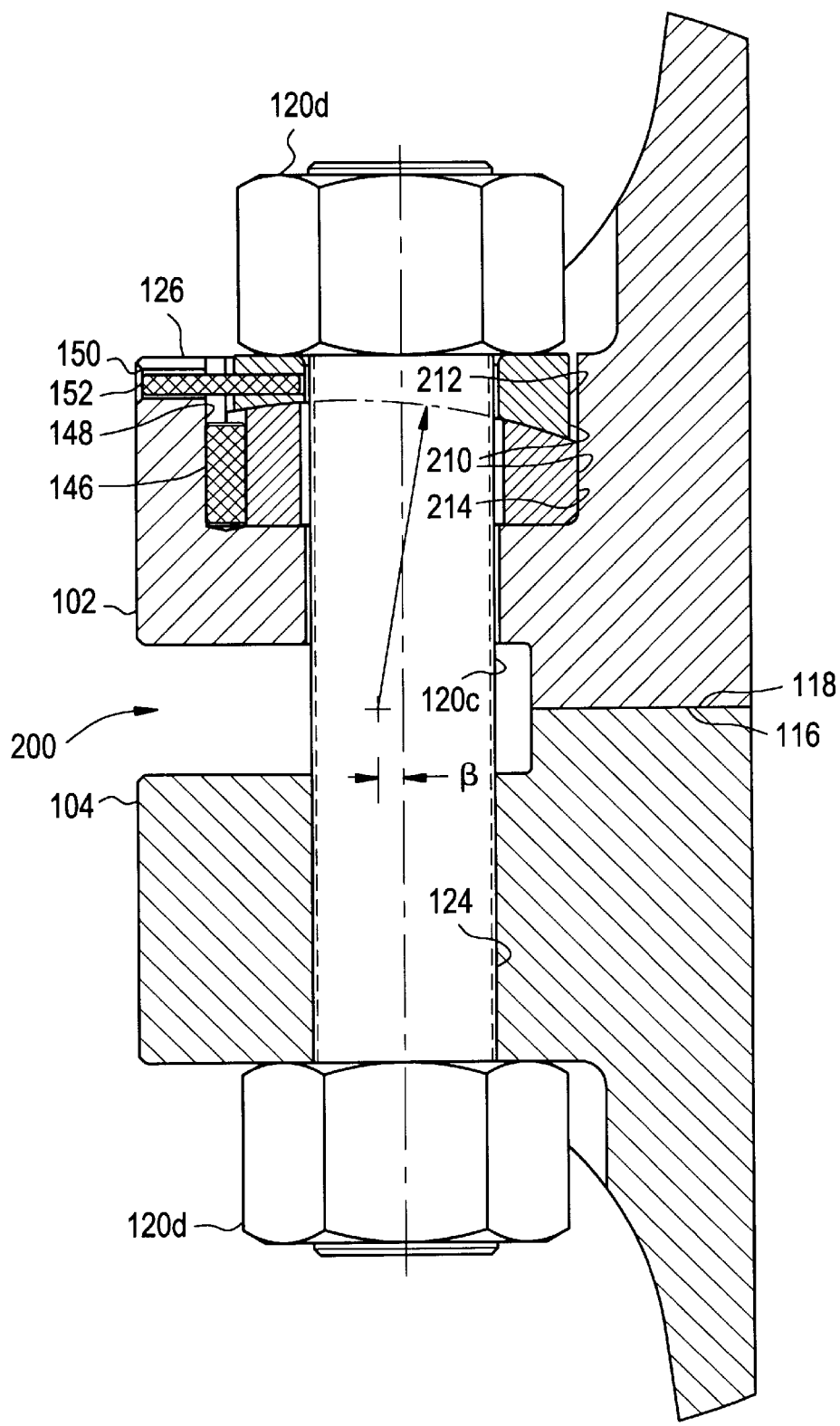
FIG. 16 is a sectional view of the second alternate form of the second embodiment of the stress reducing washer with the riser connectors unloaded.
Figure 17:
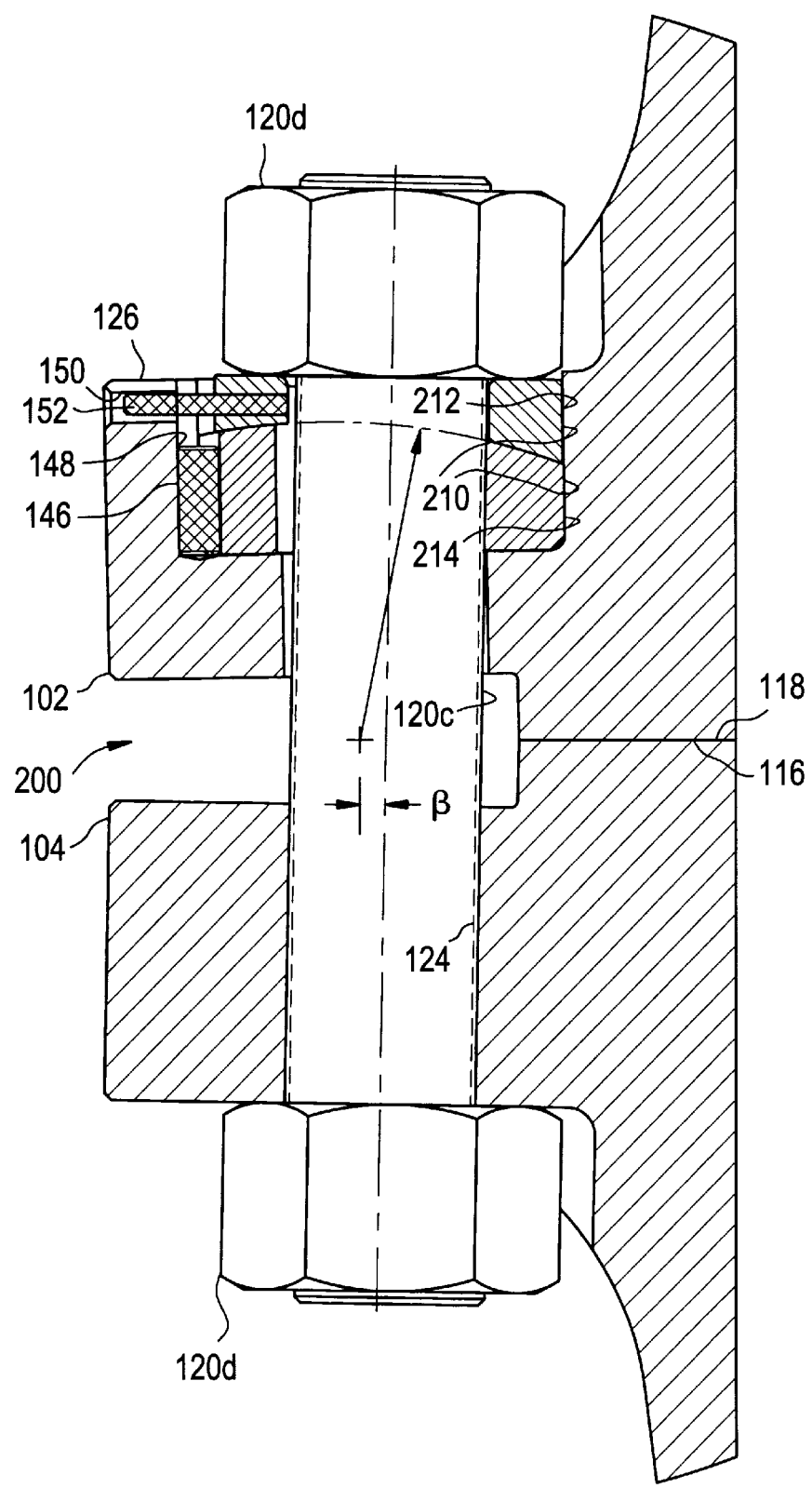
FIG. 17 is a sectional view of the second alternate form second embodiment of the stress reducing washer with the riser connectors loaded.

A second alternate form of the second embodiment is shown in FIGS. 16 and 17. This second alternate form substitutes fastener 120c and nuts 120d for fastener 120. Those items that are the same as in the first embodiment retain the same numeric designation. In all other respects, this second alternate form of the second embodiment functions the same as in the second embodiment.

Figure 6:
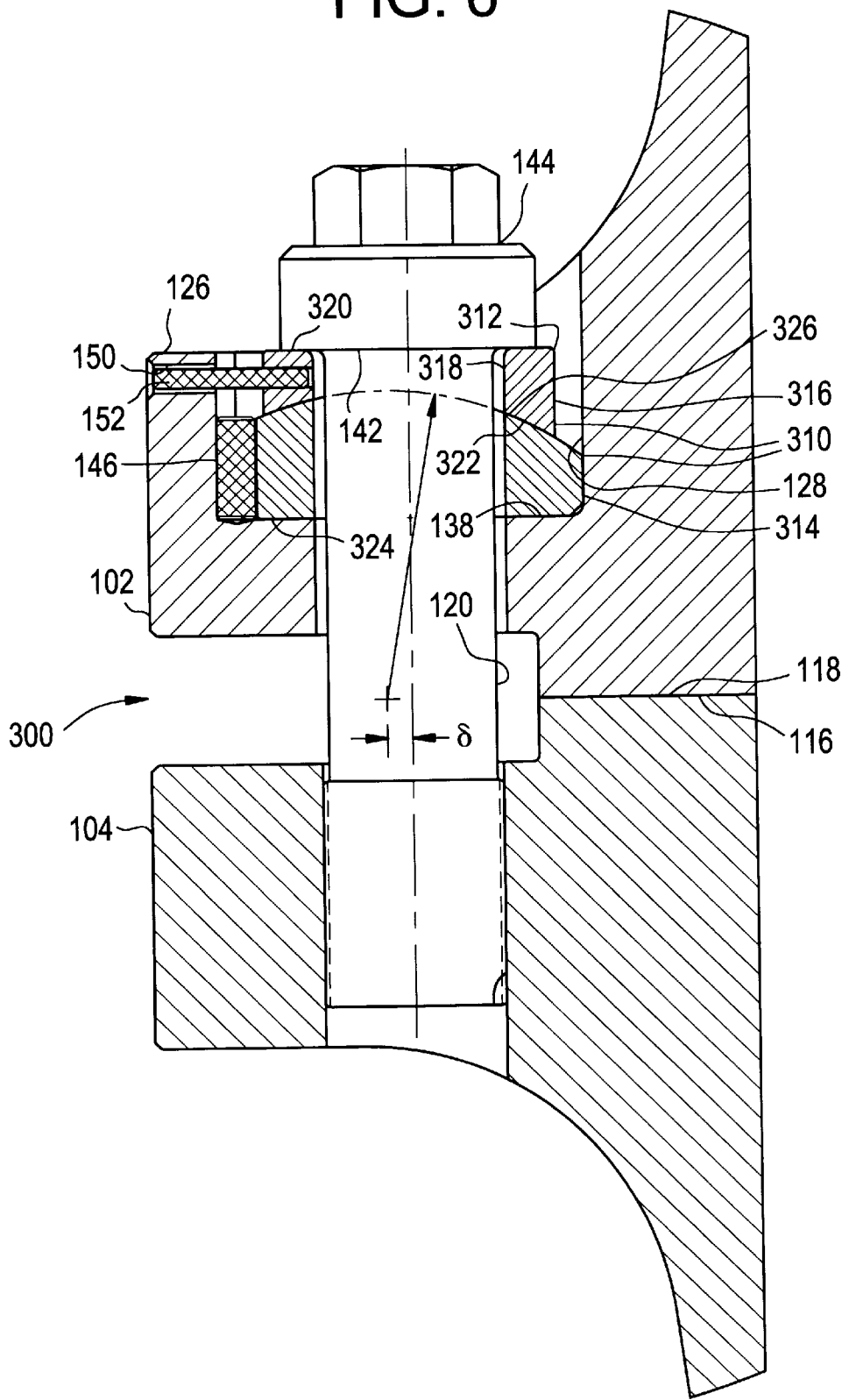
FIG. 6 is a sectional view of the third embodiment of the stress reducing washer with the riser connectors unloaded.

A third embodiment of the present invention is shown in FIG. 6. Those items that are the same as in the first embodiment retain the same numeric designation. As in the first embodiment, riser connector 300 includes upper flange 102 and lower flange 104 with raised faces 116 and 118, respectively. Fastener hole 112 in upper flange 102 receives threaded fastener 120 in close fitting relationship. Fastener hole 112 in lower flange 104 includes threads 122 to engage threads 124 of threaded fastener 120. Upper flange 102 includes backface 126 with counterbore 128 therein and concentric with fastener hole 112. Positioned within counterbore 128 is stress reducing washer 310.

Stress reducing washer 310 is of two part construction and includes upper washer 312 and lower washer 314. Upper washer 312 is a generally cylindrically shaped member with its outside diameter 316 and inside diameter 318 sized to allow lateral movement within counterbore 128 in a manner to be described hereinafter. The upper face 320 of upper washer 312 is flat to engage underside 142 of the head 144 of threaded fastener 120. The lower face 322 of upper washer 312 is cylindrically shaped as shown. The radius 323 of cylindrical lower face 322 is offset from the axis of threaded fastener 120 by the distance δ. This offset distance ensures proper relative movement between upper washer 312 and lower washer 314 to minimize the bending stresses on threaded fastener 120 in a manner to be described. The lower face 324 of lower washer 314 is perpendicular to the axis of threaded fastener 120 and in face to face contact with lower face 138 of counterbore 128. The upper face 326 of lower washer 314 is cylindrically shaped and matches the shape of lower face 322 of upper washer 312 with the same radius 323. When threaded fastener 120 is initially installed and threaded into lower flange 104, the underside 142 of the head 144 of threaded fastener 120 contacts stress reducing washer 310 as shown. Proper orientation of stress reducing washer 310 is maintained by orientation pin 146. Orientation hole 148 is drilled into backface 126 and lower washer 314 of stress reducing washer 310. Orientation pin 146 is inserted to ensure stress reducing washer 310 cannot rotate with respect to upper flange 102. A radially disposed hole 150 is drilled in upper flange 102 and upper washer 316 of stress reducing washer 310. A retaining pin 152, closely fitting therein, is inserted to ensure orientation pin 148 remains intact.

Figure 7:
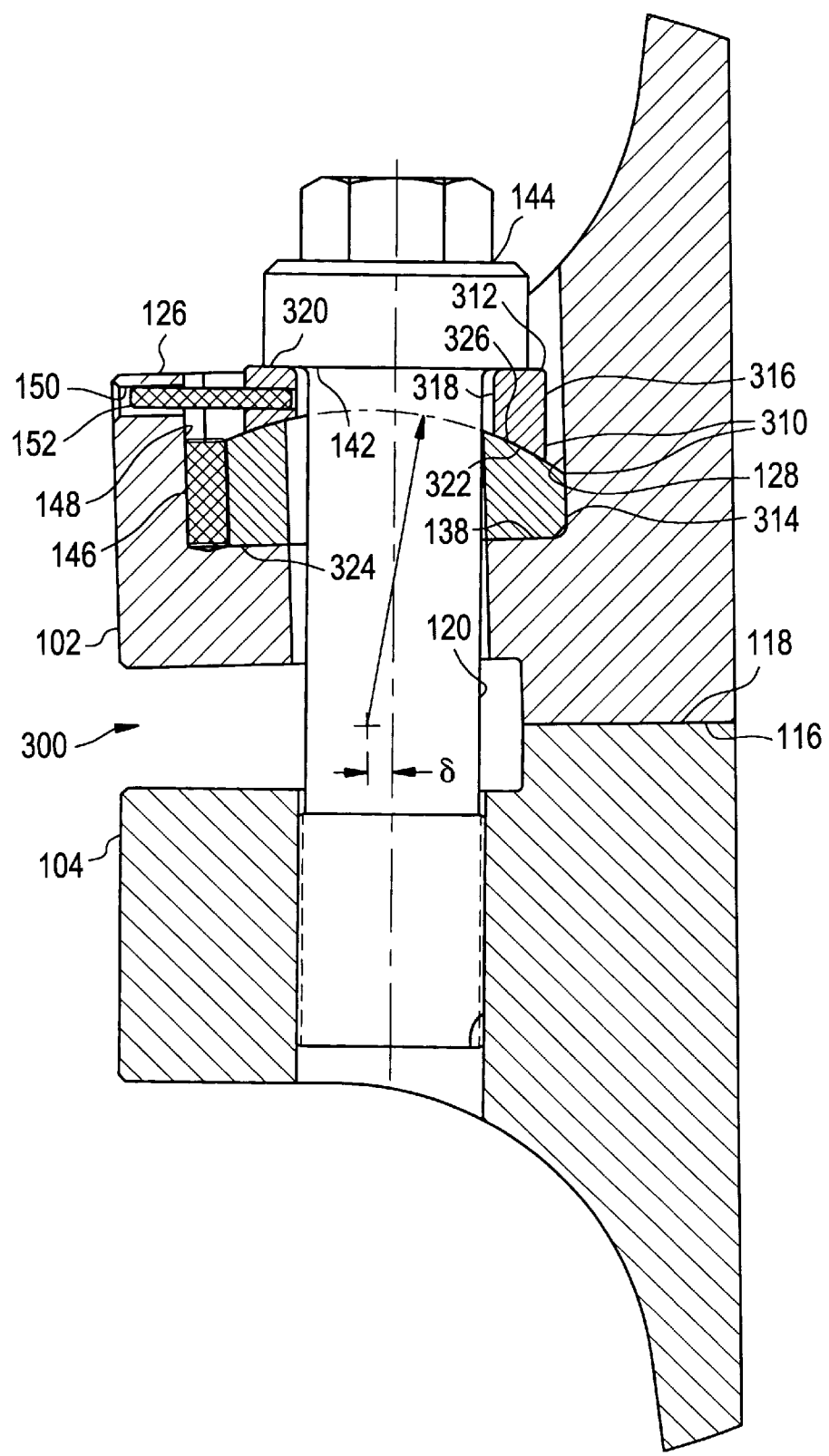
FIG. 7 is a sectional view of the third embodiment of the stress reducing washer with the riser connectors loaded.

As best seen in FIG. 7, when threaded fastener 120 is fully tightened, the flange 102 has deflected downwardly. Upper washer 312 of stress reducing washer 310 has now shifted radially with respect to flange 102 and upper face 320 of upper washer 312 of stress reducing washer 310 is in face to face contact with underside 142 of the head 144 of threaded fastener 120. This relative movement of upper washer 312 of stress reducing washer 310 minimizes the bending stress transmitted to threaded fastener 120. This reduction in bending stress on threaded fastener 120 is a significant factor in increasing the fatigue life of threaded fasteners 120.

Figure 18:
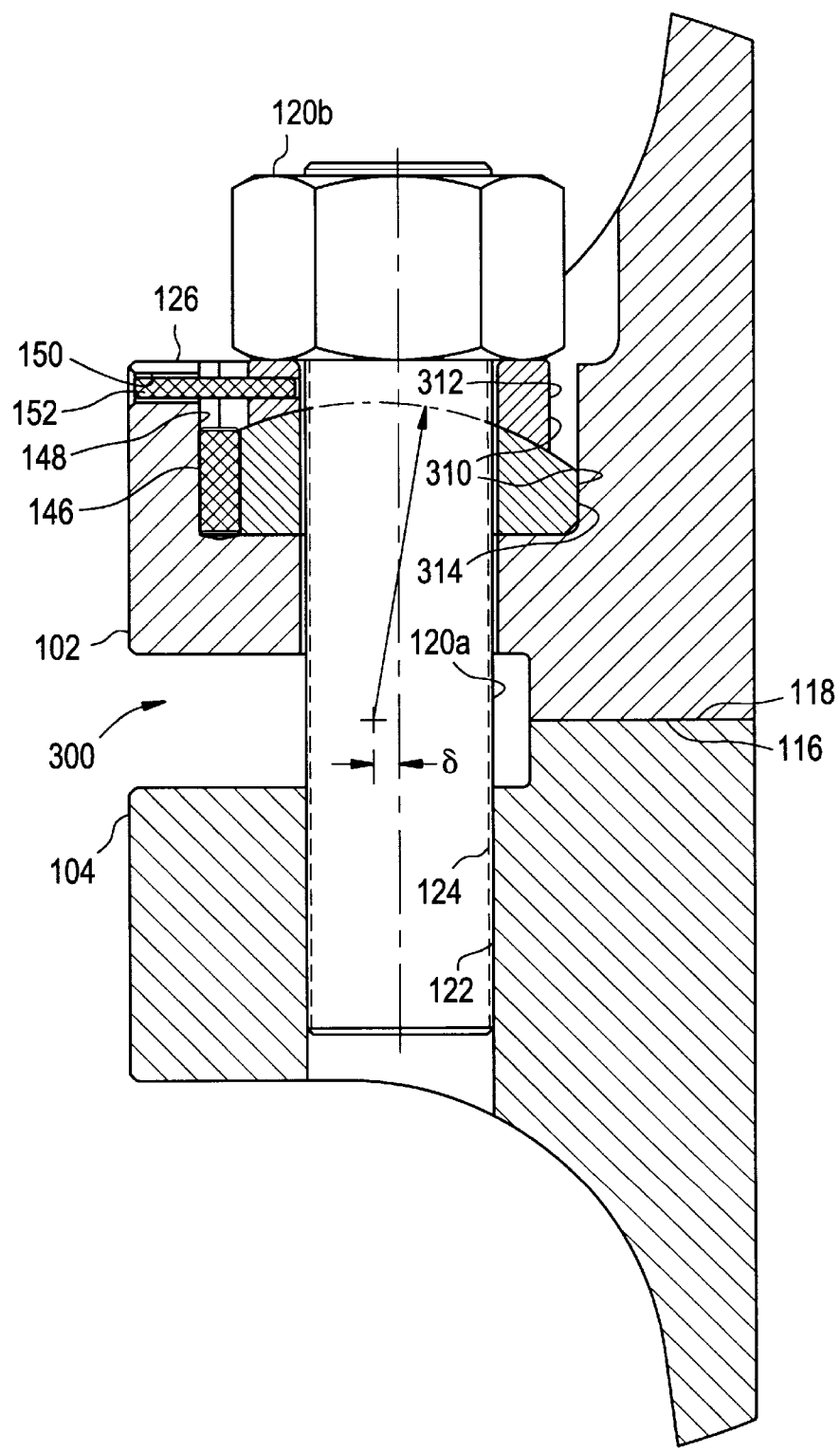
FIG. 18 is a sectional view of the first alternate form of the third embodiment of the stress reducing washer with the riser connectors unloaded.
Figure 19:
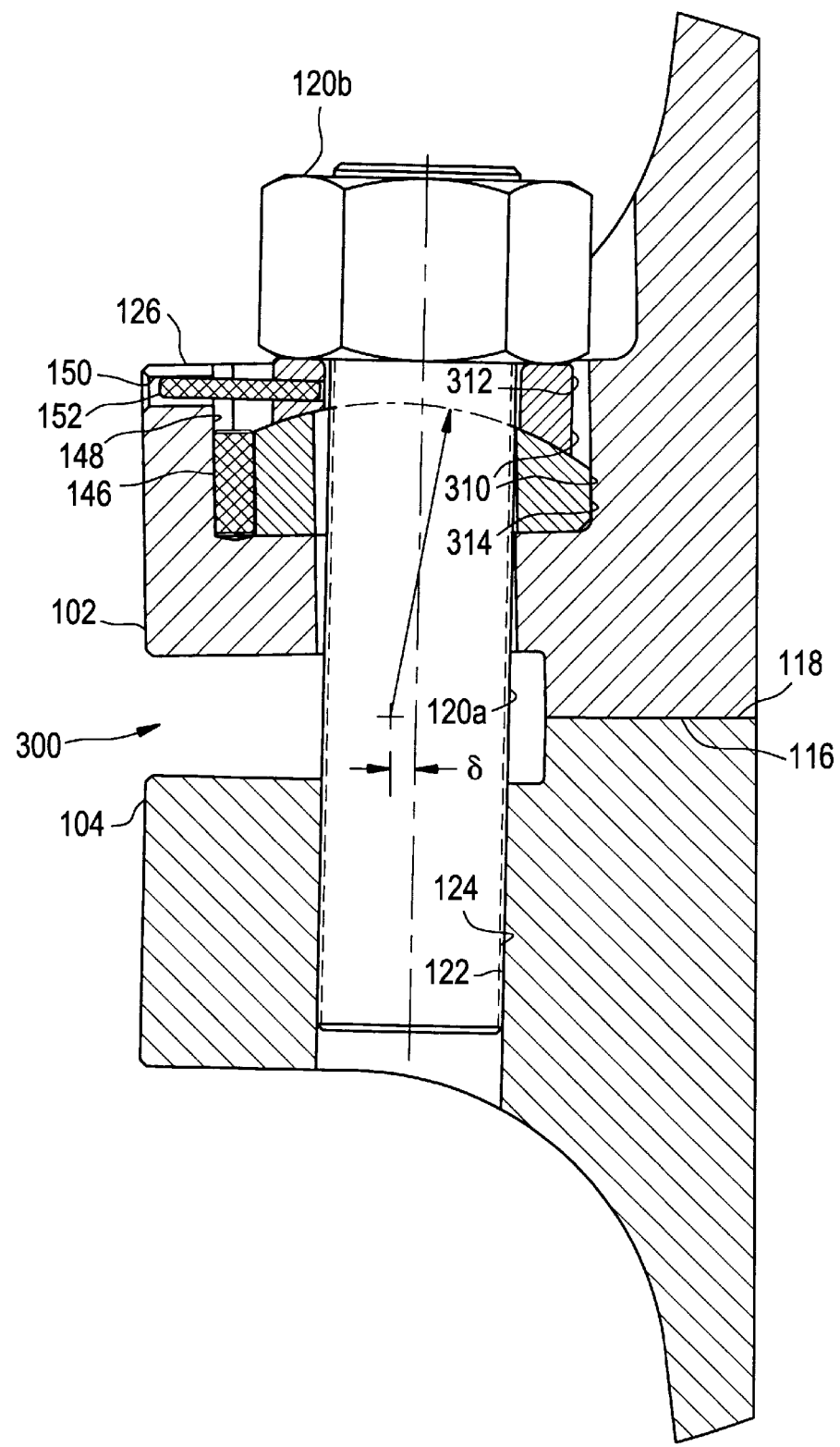
FIG. 19 is a sectional view of the first alternate form of the third embodiment of the stress reducing washer with the riser connectors loaded.
Figure 20:
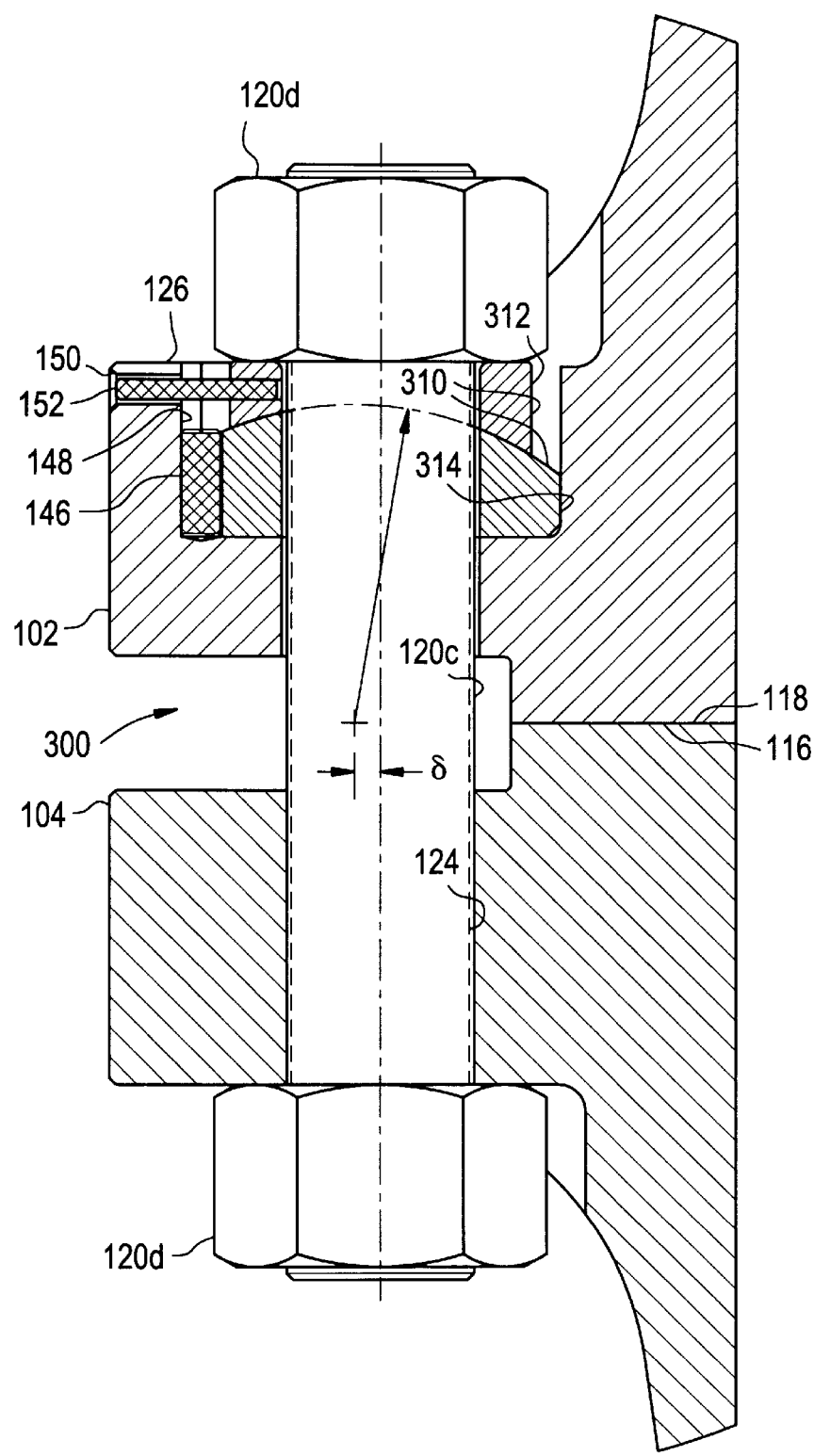
FIG. 20 is a sectional view of the second alternate form of the third embodiment of the stress reducing washer with the riser connectors unloaded.
Figure 21:
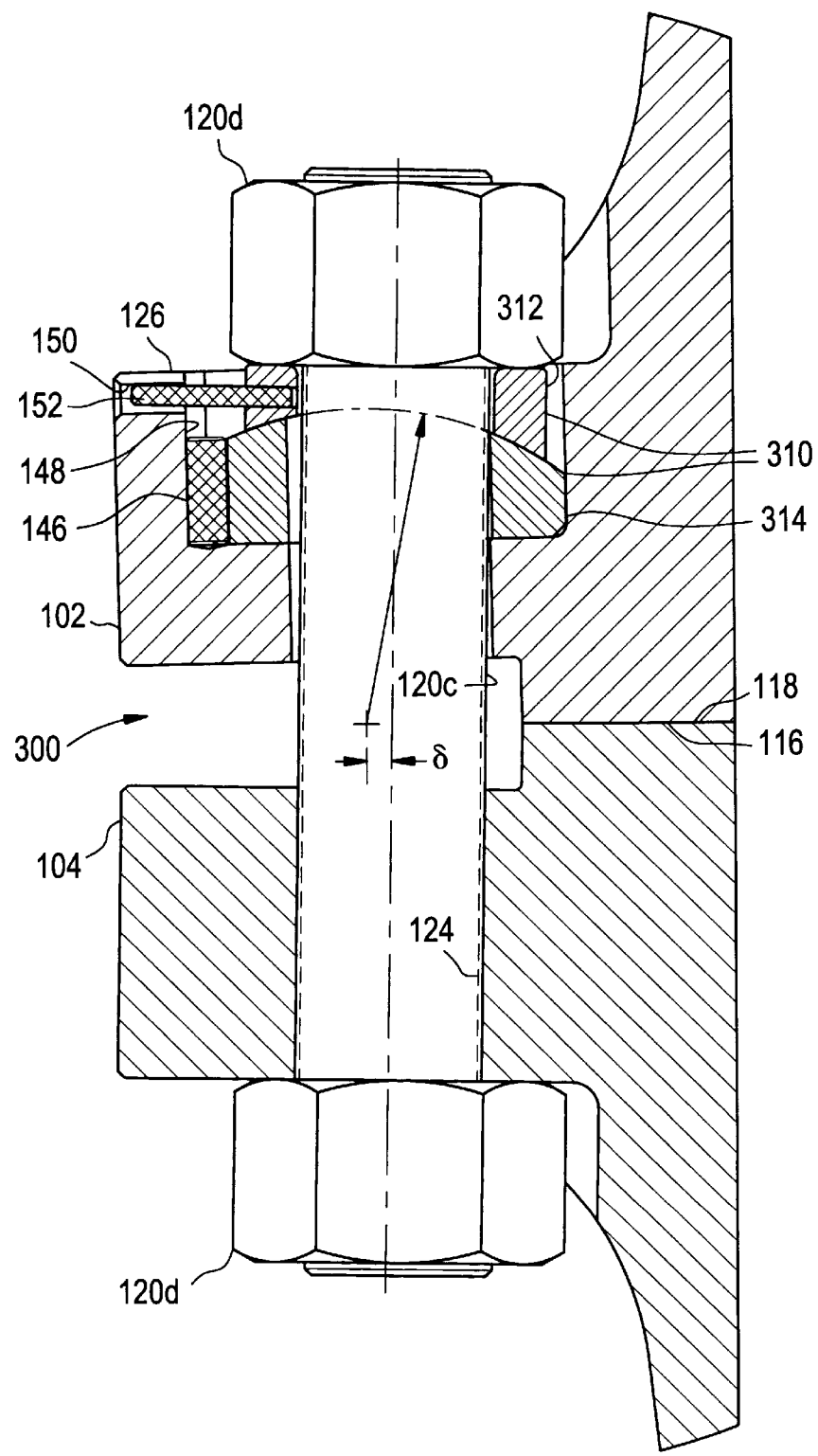
FIG. 21 is a sectional view of the second alternate form of the third embodiment of the stress reducing washer with the riser connectors loaded.

A first alternate form of the third embodiment is shown in FIGS. 18 and 19. This alternate form substitutes fastener 120a and nut 120b for fastener 120. Those items that are the same as in the third embodiment retain the same numeric designation. In all other respects, this first alternate form of the third embodiment functions the same as in the third embodiment.

A second alternate form of the second embodiment is shown in FIGS. 16 and 17. This second alternate form substitutes fastener 120c and nuts 120d for fastener 120. Those items that are the same as in the third embodiment retain the same numeric designation. In all other respects, this second alternate form of the third embodiment functions the same as in the third embodiment.

Figure 8:
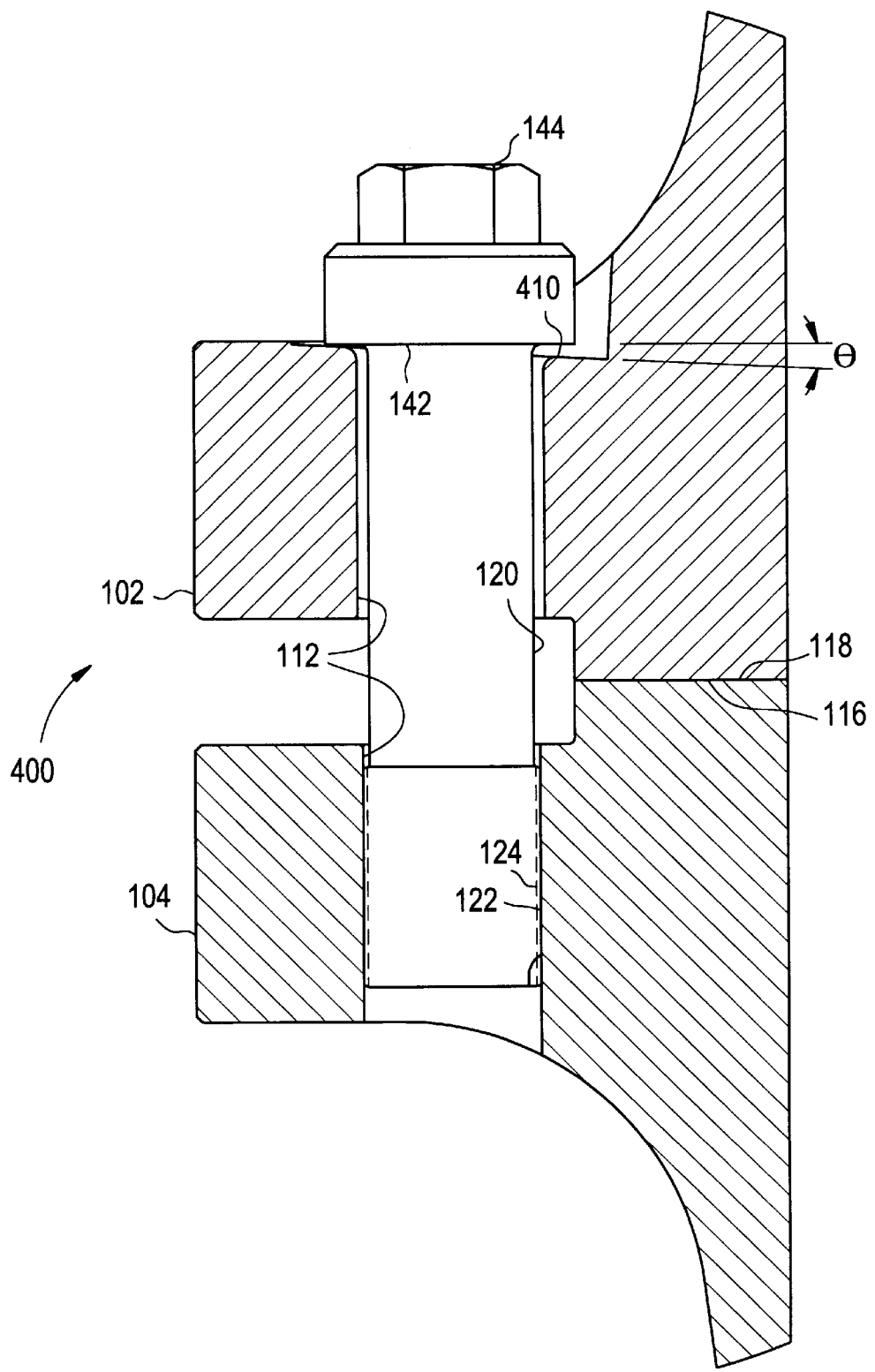
FIG. 8 is a sectional view of the fourth embodiment of the present invention with the riser connectors unloaded.

A fourth embodiment of the present invention is shown in FIG. 8. Those items that are the same as in the first embodiment retain the same numeric designation. As in the first embodiment, riser connector 400 includes upper flange 102 and lower flange 104 with raised faces 116 and 118, respectively. Fastener hole 112 in upper flange 102 receives threaded fastener 120 in close fitting relationship. Fastener hole 112 in lower flange 104 includes threads 122 to engage threads 124 of threaded fastener 120. Upper flange 102 includes backface 126 with tapered surface 410 machined thereon.

The tapered surface 410 is tapered radially as shown to define angle θ between tapered surface 410 and the underside 142 of the head 144 of threaded fastener 120. When threaded fastener 120 is initially installed and threaded into lower flange 104, the underside 142 of the head 144 of threaded fastener 120 contacts tapered surface 410 at the outer edge and angle θ as shown.

Figure 9:
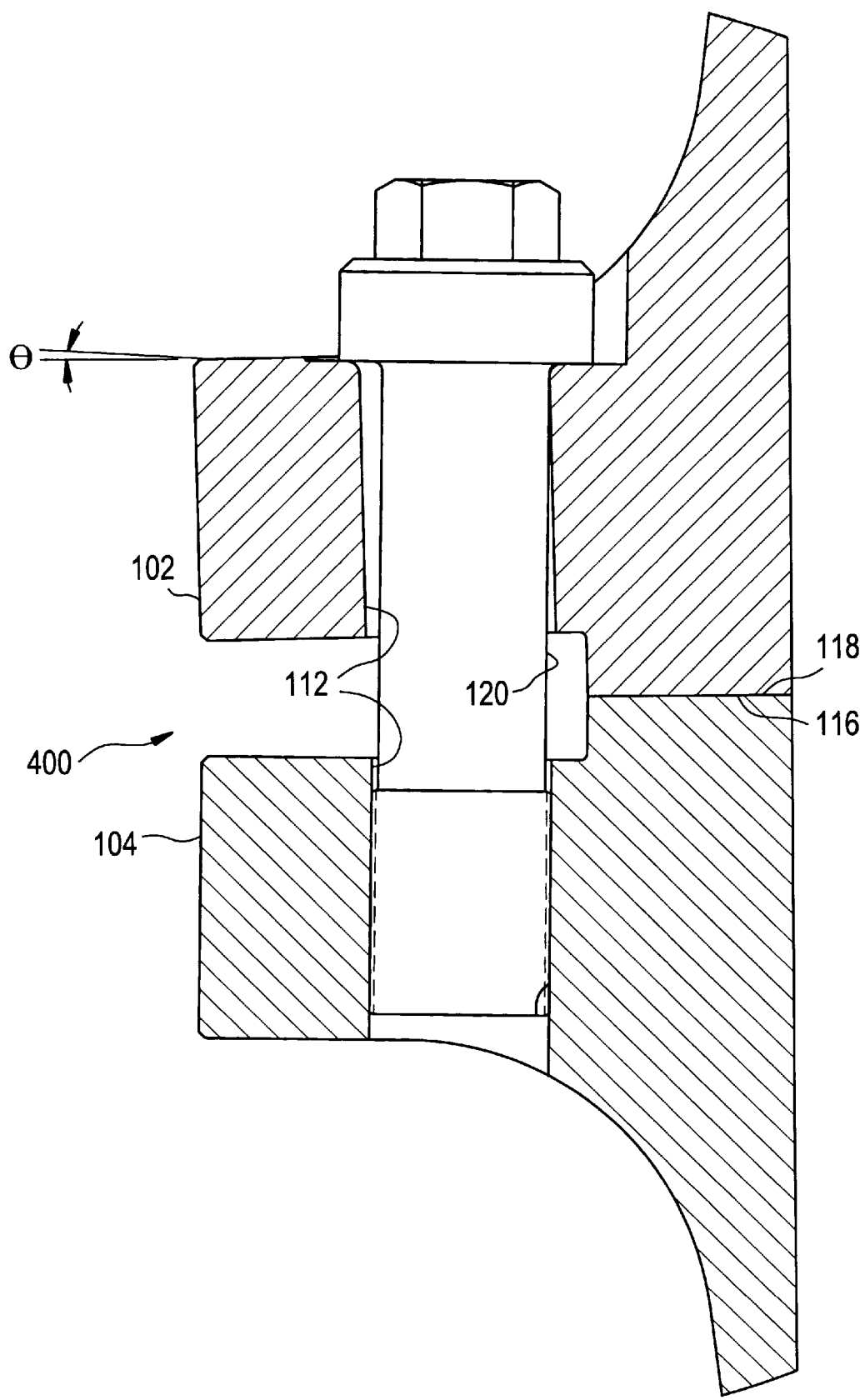
FIG. 9 is a sectional view of the fourth embodiment of the present invention with the riser connectors loaded.

As best seen in FIG. 9, when threaded fastener 120 is fully tightened, the flange 102 has deflected downwardly by the angle θ. Tapered surface 410 is in face to face contact with underside 142 of the head 144 of threaded fastener 120 and perpendicular to the axis of the fastener 120. This tapered surface 410 minimizes the bending stress transmitted to threaded fastener 120. This reduction in bending stress on threaded fastener 120 is a significant factor in increasing the fatigue life of threaded fasteners 120.

Our improved apparatus to reduce the bending stress transmitted to threaded fasteners due to flange deflection and the methods of its application will be readily understood from the foregoing description and it will be seen we have provided an improved apparatus requiring minimal modification to existing flanges to reduce the bending stresses transmitted to the threaded fasteners. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A flanged connection fastener bending stress reduction apparatus, comprising:
   first and second flanges in facing relationship, said first flange having a plurality of fastener holes therethrough, said second flange having a plurality of complementary fastener holes therein;
   said first flange fastener holes having a counterbore on the back face of said first flange;
   a stress reducing washer positioned in said counterbore on said back face of said first flange fastener holes;
   an orienting means for maintaining said stress reducing washer in a preferred orientation in said counterbore;
   a fastener extending through said first flange fastener holes and said stress reducing washer;
   said stress reducing washer configured to minimize bending stress on said fastener when said fastener is tensioned;
   said fastener including first and second preload retaining means; and,
   said fastener first and second preload retaining means engaging said first and second flanges, respectively, whereby tensioning of said fastener preloads said fastener and maintains said first and second flanges in preloaded abutting relationship.

2. A flanged connection fastener bending stress reduction apparatus according to claim 1 wherein:
   said first fastener preload retaining means includes a flanged end, said flanged end having an upper end configured to receive a wrenching means for tightening said fastener, said lower end of said flanged end of said first fastener preload retaining means having a flat face;
   said second fastener preload retaining means includes a threaded end; and,
   said second flange complementary holes are threaded to receive said second fastener preload retaining means threaded end.

3. A flanged connection fastener bending stress reduction apparatus according to claim 2 wherein:
   said stress reducing washer includes a flat lower face and a tapered upper surface;
   said flat lower face of said stress reducing washer contacting said counterbore on said back face of said first flange fastener holes; and,
   tensioning of said fastener causes said tapered upper surface of said stress reducing washer to engage said flat face of said lower end of said flanged end of said first fastener preload retaining means in face to face contact.

4. A flanged connection fastener bending stress reduction apparatus according to claim 3 wherein said orienting means for said stress reducing washer includes:
   an orientation pin orienting said stress reducing washer with respect to said fastener hole, and,
   a retainer pin to retain said orientation pin and said stress reducing washer in said first flange.

5. A flanged connection fastener bending stress reduction apparatus according to claim 2 wherein:
   said stress reducing washer includes a lower washer and an upper washer, said lower washer having a flat lower face and a spherical upper surface, said upper washer having a spherical lower surface and a flat upper face;
   said flat lower face of said lower washer of said stress reducing washer contacting said counterbore on said back face of said first flange fastener holes; and,
   tensioning of said fastener causes relative movement between said spherical upper surface of said lower washer of said stress reducing washer and said spherical lower surface of said upper washer of said stress reducing washer thereby maintaining said flat face of said lower end of said flanged end of said first fastener preload retaining means in face to face contact with said flat upper face on said upper washer of said stress reducing washer.

6. A flanged connection fastener bending stress reduction apparatus according to claim 5 wherein said orienting means for said stress reducing washer includes:
   an orientation pin orienting said stress reducing washer with respect to said fastener hole, and,
   a retainer pin to retain said orientation pin and said stress reducing washer in said first flange.

7. A flanged connection fastener bending stress reduction apparatus according to claim 2 wherein:
   said stress reducing washer includes a lower washer and an upper washer, said lower washer having a flat lower face and a cylindrical upper surface, said upper washer having a cylindrical lower surface and a flat upper face;
   said flat lower face of said lower washer of said stress reducing washer contacting said counterbore on said back face of said first flange fastener holes; and,
   tensioning of said fastener causes relative movement between said cylindrical upper surface of said lower washer of said stress reducing washer and said cylindrical lower surface of said upper washer of said stress reducing washer thereby maintaining said flat face of said lower end of said flanged end of said first fastener preload retaining means in face to face contact with said flat upper face on said upper washer of said stress reducing washer.

8. A flanged connection fastener bending stress reduction apparatus according to claim 7 wherein said means for said stress reducing washer includes:
an orientation pin orienting said stress reducing washer with respect to said fastener hole, and,
a retainer pin to retain said orientation pin and said stress reducing washer in said first flange.

9. A flanged connection fastener bending stress reduction apparatus according to claim 1 wherein:
said first fastener preload retaining means includes a threaded end and a nut positioned thereon, said lower end of said nut having a flat face;
said second fastener preload retaining means includes a threaded end; and,
said second flange complementary holes are threaded to receive said second fastener preload retaining means threaded end.

10. A flanged connection fastener bending stress reduction apparatus according to claim 9 wherein:
said stress reducing washer includes a flat lower face and a tapered upper surface;
said flat lower face of said stress reducing washer contacting said counterbore on said back face of said first flange fastener holes; and,
tensioning of said fastener causes said tapered upper surface of said stress reducing washer to engage said flat face of said nut of said first fastener preload retaining means in face to face contact.

11. A flanaed connection fastener bending stress reduction apparatus according to claim 10 wherein said orienting means for said stress reducing washer includes:
an orientation pin orienting said stress reducing washer with respect to said fastener hole, and,
a retainer pin to retain said orientation pin and said stress reducing washer in said first flange.

12. A flanged connection fastener bending stress reduction apparatus according to claim 9 wherein:
said stress reducing washer includes a lower washer and an upper washer, said lower washer having a flat lower face and a spherical upper surface, said upper washer having a spherical lower surface and a flat upper face;
said flat lower face of said lower washer of said stress reducing washer contacting said counterbore on said back face of said first flange fastener holes; and,
tensioning of said fastener causes relative movement between said spherical upper surface of said lower washer of said stress reducing washer and said spherical lower surface of said upper washer of said stress reducing washer thereby maintaining said flat face of said nut of said first fastener preload retaining means in face to face contact with said flat upper face on said upper washer of said stress reducing washer.

13. A flanged connection fastener bending stress reduction apparatus according to claim 12 wherein said orienting for said stress reducing washer includes:
an orientation pin orienting said stress reducing washer with respect to said fastener hole, and,
a retainer pin to retain said orientation pin and said stress reducing washer in said first flange.

14. A flanged connection fastener bending stress reduction apparatus according to claim 9 wherein:
said stress reducing washer includes a lower washer and an upper washer, said lower washer having a flat lower face and a cylindrical upper surface, said upper washer having a cylindrical lower surface and a flat upper face;
said flat lower face of said lower washer of said stress reducing washer contacting said counterbore on said back face of said first flange fastener holes; and,
tensioning of said fastener causes relative movement between said cylindrical upper surface of said lower washer of said stress reducing washer and said cylindrical lower surface of said upper washer of said stress reducing washer thereby maintaining said flat face of said nut of said first fastener preload retaining means in face to face contact with said flat upper face on said upper washer of said stress reducing washer.

15. A flanged connection fastener bending stress reduction apparatus according to claim 9 wherein said means for said stress reducing washer includes:
an orientation pin orienting said stress reducing washer with respect to said fastener hole, and,
a retainer pin to retain said orientation pin and said stress reducing washer in said first flange.

16. A flanged connection fastener bending stress reduction apparatus according to claim 1 wherein:
said first fastener preload retaining means includes a threaded end and a nut positioned thereon, said lower end of said nut having a flat face; and,
said second fastener preload retaining means includes a threaded end and a nut positioned thereon.

17. A flanged connection fastener bending stress reduction apparatus according to claim 16 wherein:
said stress reducing washer includes a flat lower face and a tapered upper surface;
said flat lower face of said stress reducing washer contacting said counterbore on said back face of said first flange fastener holes; and,
tensioning of said fastener causes said tapered upper surface of said stress reducing washer to engage said flat face of said nut of said first fastener preload retaining means in face to face contact.

18. A flanged connection fastener bending stress reduction apparatus according to claim 17 wherein said orienting means for said stress reducing washer includes:
an orientation pin orienting said stress reducing washer with respect to said fastener hole, and,
a retainer pin to retain said orientation pin and said stress reducing washer in said first flange.

19. A flanaed connection fastener bending stress reduction apparatus according to claim 16 wherein:
said stress reducing washer includes a lower washer and an upper washer, said lower washer having a flat lower face and a spherical upper surface, said upper washer having a spherical lower surface and a flat upper face;
said flat lower face of said lower washer of said stress reducing washer contacting said counterbore on said back face of said first flange fastener holes; and,
tensioning of said fastener causes relative movement between said spherical upper surface of said lower washer of said stress reducing washer and said spherical lower surface of said upper washer of said stress reducing washer thereby maintaining said flat face of said nut of said first fastener preload retaining means in face to face contact with said flat upper face on said upper washer of said stress reducing washer.

20. A flanged connection fastener bending stress reduction apparatus according to claim 19 wherein said orienting means for said stress reducing washer includes:

an orientation pin orienting said stress reducing washer with respect to said fastener hole, and, a retainer pin to retain said orientation pin and said stress reducing washer in said first flange.

21. A flanged connection fastener bending stress reduction apparatus according to claim 16 wherein:

said stress reducing washer includes a lower washer and an upper washer, said lower washer having a flat lower face and a cylindrical upper surface, said upper washer having a cylindrical lower surface and a flat upper face;

said flat lower face of said lower washer of said stress reducing washer contacting said counterbore on said back face of said first flange fastener holes; and, tensioning of said fastener causes relative movement between said cylindrical upper surface of said lower washer of said stress reducing washer and said cylindrical lower surface of said upper washer of said stress reducing washer thereby maintaining said flat face of said nut of said first fastener preload retaining means in face to face contact with said flat upper face on said upper washer of said stress reducing washer.

22. A flanged connection fastener bending stress reduction apparatus according to claim 21 wherein said orienting means for said stress reducing washer includes:

an orientation pin orienting said stress reducing washer with respect to said fastener hole, and, a retainer pin to retain said orientation pin and said stress reducing washer in said first flange.

\* \* \* \* \*